(12) United States Patent
Luce

(10) Patent No.: US 9,638,577 B2
(45) Date of Patent: May 2, 2017

(54) SPECTROMETER COMPRISING A PLURALITY OF DIFFRACTION GRATINGS

(71) Applicant: COMMISSARIAT A L'ENERGIE ATOMIQUE ET AUX ENERGIES ALTERNATIVES, Paris (FR)

(72) Inventor: Jacques Luce, Gujan-Mestras (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/909,666

(22) PCT Filed: Aug. 4, 2014

(86) PCT No.: PCT/EP2014/066721
§ 371 (c)(1),
(2) Date: Feb. 2, 2016

(87) PCT Pub. No.: WO2015/018790
PCT Pub. Date: Feb. 2, 2016

(65) Prior Publication Data
US 2016/0187200 A1   Jun. 30, 2016

(30) Foreign Application Priority Data
Aug. 6, 2013   (FR) ..................... 13 57812

(51) Int. Cl.
G01J 5/02   (2006.01)
G01J 3/30   (2006.01)
G01J 3/02   (2006.01)
G01J 3/18   (2006.01)

(52) U.S. Cl.
CPC ............... *G01J 3/30* (2013.01); *G01J 3/0205* (2013.01); *G01J 3/0256* (2013.01); *G01J 3/1804* (2013.01)

(58) Field of Classification Search
None
See application file for complete search history.

(56) References Cited

U.S. PATENT DOCUMENTS 7,733,492 B1 *   6/2010   Szarmes ............. G01J 3/02
                                                        356/451
2002/0135879 A1   9/2002   Pogrebinsky

FOREIGN PATENT DOCUMENTS

WO   WO 99/13543 A1   3/1999

OTHER PUBLICATIONS

International Search Report issued Oct. 21, 2014, for PCT/EP2014/066721 filed Aug. 4, 2014.
French Search Report issued Mar. 4, 2014, in French Patent Application 1357812 filed Aug. 6, 2013.

* cited by examiner

Primary Examiner — Edwin Gunberg
(74) Attorney, Agent, or Firm — Oblon, McClelland, Maier & Neustadt, L.L.P.

(57) ABSTRACT

A spectrometer including: a spectral dispersion mechanism of an initial light beam; and a photodetector. The spectral dispersion mechanism includes at least three reflective diffraction gratings parallel to consecutive sides of a convex polygon, arranged such that a portion of the initial light beam is diffracted once by each diffraction grating in turn and is diffracted at least a second time by at least one of the diffraction gratings.

13 Claims, 2 Drawing Sheets

SPECTROMETER COMPRISING A PLURALITY OF DIFFRACTION GRATINGS

TECHNICAL DOMAIN

This invention relates to the field of spectrometry, in other words spectral decomposition of a light beam and detection of spectral components thus isolated from each other.

STATE OF PRIOR ART

The invention relates to a spectrometer, in other words a spectrometry device comprising spectral dispersion means for a light beam, and a photodetector to measure a light intensity received after spectral decomposition. A location of a light spot in the plane of the photodetector is related to a wavelength using a wavelength calibration. This is done using the spectrometer with a light source having a known spectrum (for example a mercury or tungsten lamp) and the positions of the light spots obtained are recorded.

The photodetector can receive several spectral components of the light beam simultaneously, so as to simultaneously measure a light intensity as a function of the wavelength. Typically, a camera is then used.

As a variant, the photodetector has a small area, and an incident light beam is moved relative to this photodetector so as to trace the spectrum of the incident light beam point by point, corresponding to the light intensity as a function of the wavelength. Typically, a photodiode is then used.

Throughout the text, the term <<spectrometry>> will denote any technique for spectral decomposition and detection of at least one spectral component thus isolated. In particular, this term includes not only spectrography, in other words the simultaneous detection of several spatially isolated spectral components, but also techniques for consecutive detections of these several spectral components, by displacement of a light beam relative to a detector.

The spectral dispersion means may include a diffraction grating.

FIG. 1 shows a reflective diffraction grating. The diffraction grating 10 has reflecting bands or lines, located periodically parallel to the (Oz) axis of the (Oxyz) orthonormal coordinate system and in the (xOz) plane. The period defining the layout of the reflecting bands is a length called the grating pitch. The inverse of the pitch denotes the line density, usually expressed as the number of lines per millimeter.

A light beam 11 is incident on the diffraction grating 10. It forms an angle i with the normal 13 to the plane of the grating 10. The light beam 11 is monochromatic with wavelength $\lambda_0$. It is reflected by the diffraction grating in the form of several sub-beams:
- a specular sub-beam 12, corresponding to an order 0 diffraction or in other words to a specular reflection;
- a sub-beam 14, forming an angle $r_1$ with the normal 13 to the plane of the grating 10, and corresponding to an order 1 diffraction.

Diffraction orders higher than 1 are not shown on this figure for reasons of readability.

Throughout the text, <<specular reflection>> is used to refer to order 0 diffraction.

The angle $r_m$ is determined by the gratings law for a reflective diffraction grating:

$$\sin(i) + \sin(r_m) = m * N * \lambda \qquad (1)$$

where:

i is the angle formed between the incident light beam 11 and the normal 13 to the plane of the grating 10;
$r_m$ is the angle formed between the sub-beam corresponding to order m diffraction and the normal 13 to the plane of the grating 10. The term <<order m diffracted light beam>>, is also used to refer to the sub-beam corresponding to order m diffraction;
$\lambda$ is the wavelength of the order m diffracted light beam;
N is the line density in the grating 10; and
m is the diffraction order considered.

It can be seen that the angle $r_m$ depends on the wavelength. Thus, the diffraction grating 10 can spatially separate the various spectral contributions of an incident light beam.

One advantage of spectrometers comprising a diffraction grating is that they have a very large measurement spectral range, unlike other types of interferometers such as Fabry-Pérot interferometers that can only analyse a very narrow range of wavelengths.

However, the disadvantage of grating spectrometers is their very limited resolution power. In other words, their capacities for spatial separation of different wavelengths are limited. The <<resolution>> of a spectrometer means the smallest difference in wavelength that it can distinguish. The resolution power of a spectrometer is the ratio of a central wavelength to the corresponding resolution. Thus, a high value of the resolution power corresponds to a high quality of the spectrometer. It is shown that the resolution power of a diffraction grating depends on the number of lines illuminated by the incident light beam. For example, line widths of about 30 GHz can be distinguished for a wavelength of 1 µm with a diffraction grating of 1200 lines/mm illuminated by a 30 mm diameter light beam.

It can thus be seen that one solution for making a grating spectrometer with a high resolution power consists of increasing the width of the incident light beam, and therefore consequently the dimensions of the diffraction grating. A disadvantage of this solution is that the cost of a diffraction grating increases with its size.

Prior art includes a spectrometer comprising a reflective diffraction grating and a partially reflecting mirror, as disclosed in document WO 99/13543. A portion of an optical beam passes through the partially reflecting mirror before reaching the diffraction grating, and performs at least one there-and-back path between the partially reflecting mirror and the diffraction grating, before passing once again through the partially reflecting mirror. Therefore this portion of optical beam is diffracted at least twice by the diffraction grating. The number of lines illuminated by this portion of optical beam corresponds to the sum of the number of lines illuminated at each incidence on the reflective diffraction grating. The result is thus a grating spectrometer with a high resolution power, without modifying the grating pitch or increasing the grating size.

One disadvantage of such a spectrometer is that the light intensity of the portion of the incident beam, diffracted several times by the same diffraction grating, is very low due to its passes through the partially reflecting mirror.

One purpose of this invention is to disclose a diffraction grating spectrometer that does not have at least one of the disadvantages according to prior art.

In particular, one purpose of this invention is to disclose a low cost diffraction grating spectrometer with a high resolution power.

Another purpose of this invention is to disclose a diffraction grating spectrometer with low losses of light intensity.

PRESENTATION OF THE INVENTION

This objective is achieved with a spectrometer comprising means of spectral dispersion of an initial light beam.

According to the invention, the spectral dispersion means comprise at least three reflective diffraction gratings, arranged such that a portion of the initial light beam is diffracted by each of the diffraction gratings in turn and is diffracted at least a second time by at least one of the diffraction gratings.

The spectrometer according to the invention advantageously comprises a photodetector, to measure the light intensity of an incident light beam.

Said portion of the initial light beam then forms the incident light beam on the photodetector.

It can be considered that reflective diffraction gratings are parallel to consecutive sides of a convex polygon.

We will consider the orthogonal projection of the diffraction gratings in a plane, the convex polygon being defined in this plane. This is advantageously the propagation plane of said portion of the initial light beam, the diffraction gratings being arranged orthogonal to this plane. In other words, the diffraction gratings preferably have lines that are all parallel to each other, and orthogonal to a plane in which said convex polygon is defined.

Preferably, the reflective diffraction gratings are aligned on consecutive sides of the convex polygon. In other words, each diffraction grating is not only parallel to one side of the polygon, but is coincident with at least part of this side of the polygon.

According to one advantageous embodiment, a first diffraction grating is placed between a second diffraction grating and a third diffraction grating.

Preferably, the first, second and third diffraction gratings are arranged such that:
the first diffraction grating receives a first light beam and returns a first sub-beam, corresponding to order $m_1$ diffraction of the first light beam on the first diffraction grating, where $m_1$ is an integer greater than or equal to 1;
the second diffraction grating receives the first sub-beam and returns a second sub-beam, corresponding to order $m_2$ diffraction of the first sub-beam on the second diffraction grating, where $m_2$ is an integer greater than or equal to 1;
the third diffraction grating receives the second sub-beam and returns a third sub-beam, corresponding to order $m_3$ diffraction of the second sub-beam on the third diffraction grating, where $m_3$ is an integer greater than or equal to 1; and
the first diffraction grating receives the third sub-beam and returns a fourth sub-beam, corresponding to the order $m_4$ diffraction of the third sub-beam on the first diffraction grating, where $m_4$ is an integer greater than or equal to 1.

Preferably, orders $m_1$, $m_2$, $m_3$, and $m_4$ are equal.

Orders $m_1$, $m_2$, $m_3$, and $m_4$ are advantageously equal to 1.

An angle between the first and second diffraction gratings may be equal to an angle between the first and third diffraction gratings.

The diffraction gratings are advantageously aligned on consecutive sides of a regular polygon.

The diffraction gratings may be arranged such that:
each diffraction grating receives an incident light beam, and returns a sub-beam corresponding to the order $m_i$ diffraction of the incident light beam on said diffraction grating, where $m_i$ is an integer greater than or equal to 1;
an absolute value of a difference between an angle of incidence of the incident light beam on the diffraction grating, and a median angle of the sub-beam relative to said diffraction grating, is the same within plus or minus six degrees for each diffraction grating.

An optical path followed by said portion of the initial light beam may directly connect one diffraction grating to the next.

Preferably, each diffraction grating has reflecting stripes parallel to a reference axis, and is installed on means of pivoting about the reference axis.

Each diffraction grating may have the same grating pitch.

An angle between two consecutive diffraction gratings is advantageously between 140° and 160°, each diffraction grating having a line density equal to 1740 lines per millimeter.

The invention also relates to a method of using a spectrometer according to the invention, by which said spectrometer is configured for a central wavelength of the incident light beam by pivoting each diffraction grating alternately by an angle θ and an angle −θ.

BRIEF DESCRIPTION OF THE DRAWINGS

This invention will be better understood after reading the description of example embodiments given purely for information and in no way limitative, with reference to the appended drawings in which.

DETAILED PRESENTATION OF PARTICULAR EMBODIMENTS

Figure 1:
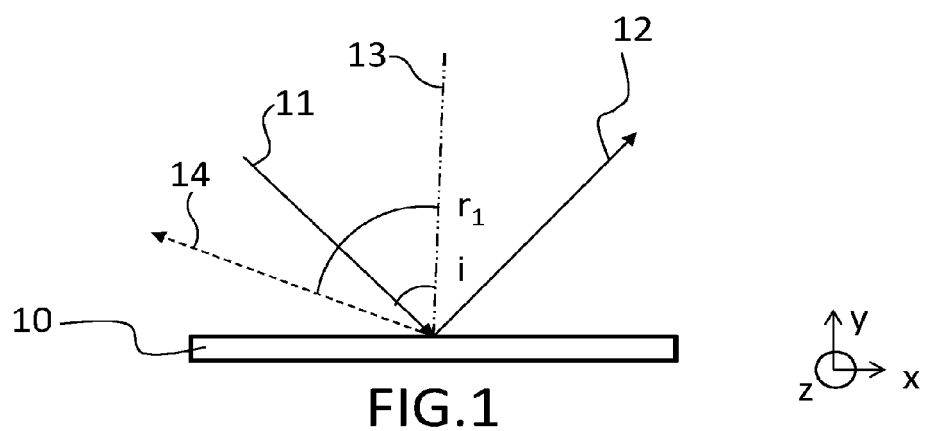
FIG. 1 illustrates a reflective diffraction grating.
Figure 2:
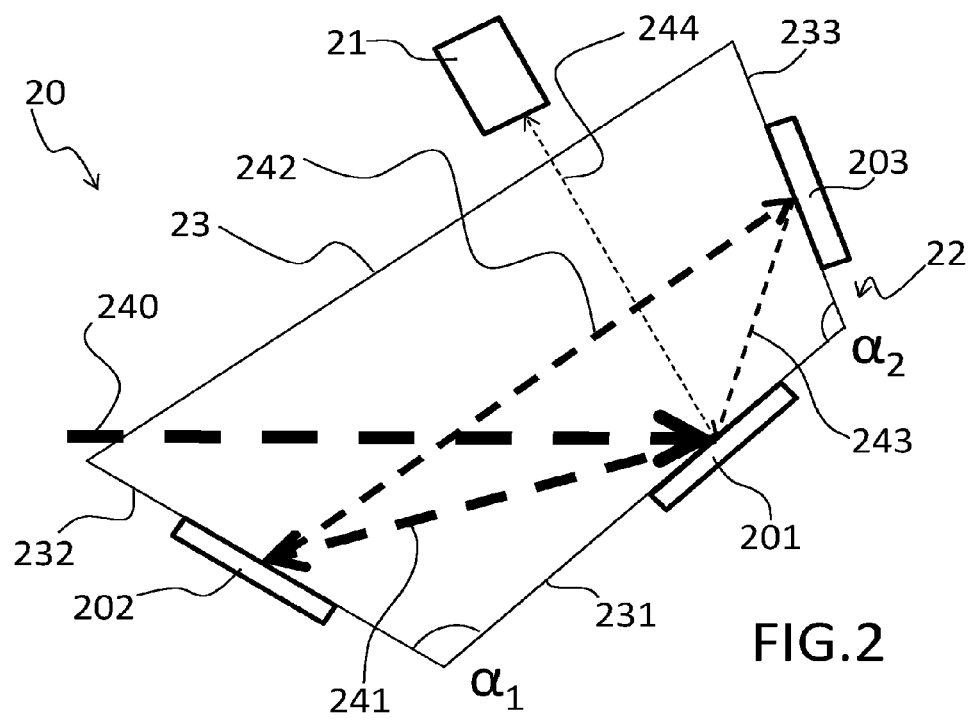
FIG. 2 diagrammatically illustrates a spectrometer according to the invention.

FIG. 2 diagrammatically illustrates a spectrometer 20 according to the invention.

The spectrometer 20 comprises:
a photodetector 21 as described in the introduction, to measure the light intensity of an incident beam; and
spectral dispersion means 22 according to the invention.

The spectral dispersion means 22 comprise at least three reflective diffraction gratings. FIG. 2 shows the example of three reflective diffraction gratings 201, 202, 203.

Each reflective diffraction grating 201, 202, 203 is aligned on a side 231, 232 and 233 respectively of a convex polygon 23. The sides 232, 231, 233 are consecutive sides of the polygon 23. Together, they define an open polygon. In other words, the number of sides in the convex polygon 23 is larger than the number of reflective diffraction gratings.

Throughout this text, the diffraction gratings are numbered in the order in which they are reached for the first time by the initial light beam (broken down into sub-beams as the diffractions take place, as described in the following).

The diffraction gratings 201, 202, 203 are arranged such that a portion of an initial light beam 240 is diffracted once by each of the diffraction gratings in turn, and at least a second time by at least one of the diffraction gratings.

In particular, the first diffraction grating 201 receives the initial light beam 240, and returns a first sub-beam 241 corresponding to order $m_1$ diffraction of the initial light beam 240 on the first diffraction grating 201 ($m_1$ is an integer greater than or equal to 1).

The second diffraction grating 202 receives the first sub-beam 241, and returns a second sub-beam 242 corresponding to order $m_2$ diffraction of the first sub-beam 241 on the second diffraction grating 202 ($m_2$ is an integer greater than or equal to 1).

The third diffraction grating 203 receives the second sub-beam 242, and returns a third sub-beam 243 corresponding to order $m_3$ diffraction of the second sub-beam 242 on the third diffraction grating 203 ($m_3$ is an integer greater than or equal to 1).

The first diffraction grating 201 receives the third sub-beam 243, and returns a fourth sub-beam 244 corresponding to order $m_4$ diffraction of the third sub-beam 243 on the first diffraction grating 201 ($m_4$ is an integer greater than or equal to 1).

Thus, according to the invention, the diffraction gratings are arranged such that the optical path followed by said portion of light beam directly connects the first diffraction grating to the second diffraction grating, the second diffraction grating to the third diffraction grating, and the third diffraction grating to the first diffraction grating.

In other words, this optical path directly connects the first diffraction grating to the second diffraction grating, and then immediately the second diffraction grating to the third diffraction grating, and then immediately the third diffraction grating to the first diffraction grating.

The invention is based on this particular arrangement of diffraction gratings. Therefore the presence of the photodetector is not necessary to define an innovative and inventive spectrometer.

A convex polygon has been mentioned simply to specify the position of the diffraction gratings relative to each other at an earlier stage. This position can be simply defined by the optical path as described above.

The position of the diffraction gratings may be adapted to any initial light beam emitted by a light source, so as to satisfy the condition on the optical path as defined above.

The fourth sub-beam 244 is directed towards the photodetector 21.

The fourth sub-beam 244 corresponds to a portion of the initial light beam that was diffracted once by the second and third diffraction gratings 202 and 203, and that was diffracted twice by the first diffraction grating 201.

Thus, the optical path followed by said portion of light beam directly connects the first diffraction grating to the second diffraction grating, the second diffraction grating to the third diffraction grating, and then the third diffraction grating to the first diffraction grating. Then, in other words immediately after this second incidence on the first diffraction grating, said optical path does not directly connect the first diffraction grating to the second diffraction grating. This special feature applies to all embodiments of a spectrometer according to the invention. Consequently, the spectrometer 20 according to the invention does not form a resonator. Similarly, the spectrometer 20 according to the invention does not form a closed cavity.

Preferably, diffraction orders $m_1$, $m_2$, $m_3$ and $m_4$ are the same and advantageously have a value less than or equal to 2, and preferably 1.

Thus, an initial light beam with diameter d will cover two gratings once, and one grating twice. The initial light beam makes four passes on a diffraction grating. Assuming that all grating pitches are identical, the resolution power of the spectrometer 20 is therefore the same as that of a spectrometer receiving a light beam with diameter $4d$, and consequently comprising a diffraction grating four times larger. In general, the initial light beam with diameter d will cover N gratings a first time, and s gratings at least a second time, where N is an integer greater than or equal to 3 and s is an integer greater than or equal to 1. In other words, (N−s) gratings are covered once, and s gratings are covered at least twice. Therefore the resolution power of a spectrometer according to the invention is at least equivalent to that of a spectrometer receiving a light beam with diameter (N+s)*d, and consequently comprising a diffraction grating (N+s) times larger.

The invention is based on the use of several diffraction gratings, at least one of which is used twice.

It is not based on the use of a large diffraction grating. According to the invention, a spectrometer with a high resolution power is obtained using smaller and therefore less expensive diffraction gratings. Thus, a less expensive and smaller spectrometer is made. Furthermore, there is no need to use shaping optics for a light beam emitted by a source to be studied, so as to obtain a large beam width. This contributes to reducing the cost and size of the spectrometer according to the invention.

In particular, the resolution power that can be obtained is similar to the resolution powers that can be obtained using an interferometric method, for example using a Fabry-Pérot or Fizeau type spectrometer. The invention is particularly advantageous because it gives better precision in determining the wavelength than a Fabry-Pérot type spectrometer in which there is spatial-spectral dependence.

It can also be seen that the sub-beams can propagate directly from one diffraction grating to the next, in other words without passing through optics such as at least partially reflecting optics. In other words, the optical path followed by the portion of the initial light beam corresponding to the sub-beam 244, directly connects one diffraction grating to the next without any intermediate reflection on an interposed mirror. Therefore, there are no energy losses due to absorption in optics located between the diffraction gratings, or by only partial transmission or reflection of a beam between two passes on a diffraction grating. Therefore, losses of light intensity with the spectrometer according to the invention are low. It can thus be used to study the spectrum of an initial light beam with low light intensity, without the need to make use of a particularly sensitive photodetector at the output. Furthermore, the lack of any additional optics between the diffraction gratings contributes to reducing the cost and size of the spectrometer according to the invention.

Nor is there any need to position the gratings in phase, which facilitates adjustment of the positions of each diffraction grating of the spectrometer according to the invention.

Advantageously, the initial light beam 240 is incident on the first diffraction grating 201 with a grazing incidence, in other words with an angle of incidence greater than 60°. In other words, the term m*N*λ in formula (1) given in the introduction is advantageously between 1.5 and 1.8.

Those skilled in the art will easily determine different geometries of a spectrometer according to the invention, to obtain a first pass on each diffraction grating and at least one second pass on one of them. All that they need to do to achieve this is:

resolve a system of equations based on the gratings law (see equation (1)) applicable to each pass on a diffraction grating; and consider several boundary conditions.

For example, these boundary conditions may be a central wavelength of the initial light beam (corresponding to an intensity peak of said beam), a line density in the diffraction gratings, a diffraction order to be considered, etc. It would also be possible to state that the difference between the angle of incidence and the diffraction angle of the order considered is approximately equal to the same absolute value for each diffraction grating (within a few degrees, for example ±6° or ±2°, or even ±1°) as a condition. This difference may be alternately positive and negative (considering the chronological order of successive incidences on the diffraction gratings).

For example, a spectrometer according to the invention is made, adapted to an initial light beam with a central wavelength of 632 nm, said beam arriving on the first diffraction grating with an angle of incidence equal to 40°. The diffraction order considered is the second diffraction order. Such a spectrometer has the following characteristics:
- three diffraction gratings all with a line density equal to 1200 lines per millimeter;
- an angle $\alpha_1$ between the first and second diffraction gratings equal to 124°; and
- an angle $\alpha_2$ between the first and third diffraction gratings equal to 130.7°.

Thus, the incident light beam 240 arrives on the first diffraction grating 201 at an angle of incidence $i_1=40°$, and a first sub-beam 241 leaves at a second order diffraction angle $r_{2-1}=61°$.

The first sub-beam 241 arrives on the second diffraction grating 202 at an angle of incidence $i_2=63°$, and a second sub-beam 242 leaves at a second order diffraction angle $r_{2-2}=38.7°$.

The second sub-beam 242 arrives on the third diffraction grating 203 at an angle of incidence $i_3=36°$, and a third sub-beam 243 leaves at a second order diffraction angle $r_{2-3}=68.3°$.

The third sub-beam 243 arrives on the first diffraction grating 201 at an angle of incidence $i_4=62.4°$, and a fourth sub-beam 244 leaves at a second order diffraction angle $r_{2-4}=39°$.

Advantageously sub-beams 241, 242, 243, 243 and the beam 240 all propagate in the same plane, orthogonal to the direction of lines in diffraction gratings 201, 202, 203.

Figure 3:
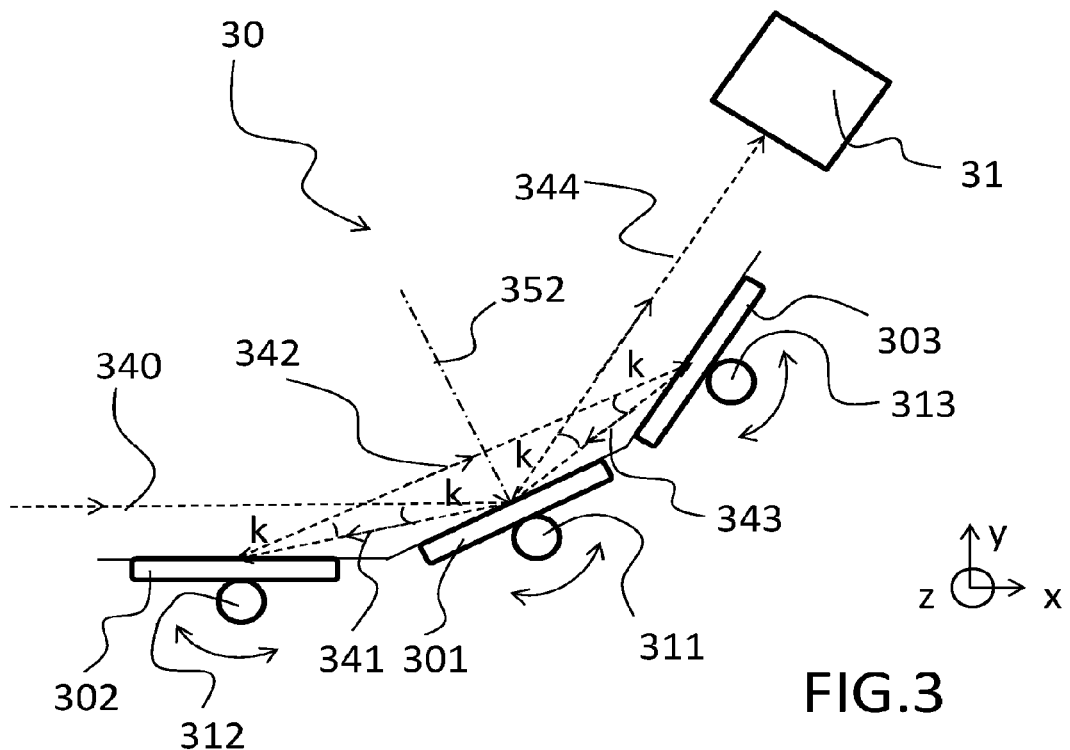
FIG. 3 illustrates a first embodiment of a spectrometer according to the invention.

FIG. 3 illustrates a first embodiment of a spectrometer 30 according to the invention. The embodiment in FIG. 3 is a special case of the spectrometer shown in FIG. 2. The spectrometer in FIG. 3 is adapted to receive an incident light beam with a central wavelength of 1053 nm, and incident with an angle of about 61° on the first diffraction grating.

In FIG. 3, the spectrometer 30 comprises spectral dispersion means formed from three diffraction gratings 302, 301, 303 arranged on consecutive sides of a polygon, advantageously a regular dodecagon.

The diffraction grating 301 forms a first diffraction grating. The grating 301 is placed between a second diffraction grating 302 and a third diffraction grating 303, in other words, it is surrounded laterally by these other two diffraction gratings, as shown in FIG. 3.

Each diffraction grating has a line density equal to 1740 lines per millimeter.

The angle formed between the first and second diffraction gratings 301, 302 is equal to the angle formed between the first and third diffraction gratings 301, 303, namely an angle of 150°. The result obtained is thus a structure approximately symmetric about a plane parallel to the lines of the first diffraction grating and passing through the centre of this diffraction grating 301. The lines of the diffraction gratings are parallel to the (Oz) axis, and are orthogonal to the propagation plane of the light beams (Oxy).

As a variant, each angle may be different and between 148° and 152°.

The first diffraction grating 301 receives the initial light beam 340 and returns a first sub-beam 341, corresponding to the first diffraction order of the initial light beam on the first diffraction grating.

The second diffraction grating 302 receives the first sub-beam 341 and returns a second sub-beam 342, corresponding to the first diffraction order of the first sub-beam on the second diffraction grating.

The third diffraction grating 303 receives the second sub-beam 342 and returns a third sub-beam 343, corresponding to the first diffraction order of the second sub-beam on the third diffraction grating.

The first diffraction grating 301 receives the third sub-beam 343 and returns a fourth sub-beam 344, corresponding to the first diffraction order of the third sub-beam on the first diffraction grating.

The fourth sub-beam 344 is received by the photodetector 31.

The initial light beam 340 is incident on the first diffraction grating 301 at an angle of incidence of 61°. This angle is measured relative to the normal 352 to the first diffraction grating 301. The angle of incidence is chosen to be close to 60°, within 2°. This angle must be different from 60.2° to prevent the fourth sub-beam 344 from propagating along the same direction as the specular reflection of the initial light beam 340 on the first diffraction grating 301 (order 0 diffraction).

According to the invention, the initial light beam has a maximum intensity at a known central wavelength. Preferably, it is a wavelength in the infrared (advantageously between 1 μm and 2 μm). In this case, the central wavelength is equal to 1053 nm. The spectrometer 30 is capable of determining the other spectral components of the initial light beam, close to this central wavelength. The measurement range is typically 200 nm. Therefore, it can be seen that the spectrometer according to the invention has good spectral acceptance, that can be up to 200 nm wide.

As a variant, the central wavelength is not known precisely, and at least one parameter of the spectrometer according to the invention is adjusted to be able to detect a light signal corresponding to a beam diffracted twice on the grating 301 and once on the gratings 302 and 303, on the photodetector 31. In particular, an angle of incidence of the initial light beam on the first diffraction grating 301 can be modified. The orientation of each of the diffraction gratings 301, 302, 303 can also be modified separately.

In FIG. 3, each of the diffraction gratings 301, 302, 303 is installed on means 311, 312, 313 respectively of pivoting about the z axis. The z axis is parallel to the reflecting lines or bands of the diffraction gratings 301, 302, 303. By pivoting the gratings about these pivot means, the geometry of the spectrometer 30 according to the invention can be adjusted as a function of the central wavelength of the initial light beam. The result obtained is a spectrometer tunable in wavelength.

In particular, the orientation of the diffraction gratings of the spectrometer according to the invention can be adjusted by pivoting each of the gratings by an angle θ and an angle −θ alternately (the diffraction gratings then being considered in the order in which they are distributed on the consecutive sides of the polygon, in this case a dodecagon). In the example in FIG. 3, the second and third diffraction gratings 302, 303 are pivoted by an angle −θ, and the first diffraction grating 301 is pivoted by an angle θ. The spectrometer in FIG. 3 can thus be adapted to an initial light beam with a central wavelength that can vary between 1000 nm and 1200 nm. It should be noted that in the text, diffraction gratings are numbered in the order in which part of the incident light beam propagates from grating in grating. Nevertheless, for pivoting of gratings by an angle θ and by an angle −θ alternately, the diffraction gratings are considered in the order in which they are distributed on the consecutive sides of the polygon.

Other means could be provided to make a spectrometer with a tunable wavelength, particularly means of translation of a diffraction grating in the (xOy) plane orthogonal to the (Oz) axis.

The location of the photodetector 31 relative to the spectral dispersion means can be modified accordingly. The photodetector 31 can then be mounted on a mobile plate, so as to be able to detect a required light beam.

In one preferred variant, the photodetector 31 is fixed. A mobile mirror can then be provided to move said required light beam relative to the photodetector.

Each diffraction grating receives an incident light beam, and returns a sub-beam corresponding to the first order diffraction of said incident beam on this diffraction grating.

It should be noted that this geometry as described with reference to FIG. 3 is particularly advantageous in that it has some periodicity. In particular, the absolute value of the difference between:
 the angle of incidence of the incident light beam on a diffraction grating; and
 a median angle of the sub-beam relative to said diffraction grating;
is the same (within a few degrees, for example ±6°, or ±2°, or even ±1°), for each diffraction grating. Said difference between these two angles is denoted k on FIG. 3. The term "median angle" is used because the different spectral contributions of the incident light beam are spatially separated in the sub-beam considered. The median angle corresponds to the diffraction angle at the central wavelength, in this case 1053 nm.

It would be possible to provide guiding or positioning means (not shown) for a light source to be studied, adapted to position said source such that the initial light beam has a required angle of incidence on the first diffraction grating. These guiding means may be placed on a moving plate, so that this angle of incidence can be modified as a function of the light source.

According to one variant not shown, the initial light beam is brought to the input of the spectrometer according to the invention by an optical fibre with a numerical aperture of 0.12. A collimation lens is placed at the output from the optical fibre.

The photodetector is advantageously a detector with a two-dimensional, surface detection zone. One advantage of such a detector is that the spectrum of the incident light beam can be obtained by analysing a single light pulse. By using the axis perpendicular to the spreading axis of spectral components of the initial light beam, spectra from several light beams incident on the spectral dispersion means of the spectrometer according to the invention can be detected simultaneously. The light beams propagate in planes parallel to the (xOy) plane. This technique is called <<multiplexing of several measurement channels>>.

For example, the photodetector may be a 2456×2058 pixels camera, with a pixel width of 3.45 µm. A focusing lens (not shown) is advantageously placed at the output from the dispersion means, to transform an angular dispersion by the dispersion means into a lateral displacement on the photodetector. The focal distance of this focusing lens is determined considering the size of the pixel of the photodetector, such that this pixel size does not limit the resolution power of the spectrometer according to the invention.

As a variant, the photodetector is a photodiode, for use with recurrent signals.

Figure 4:
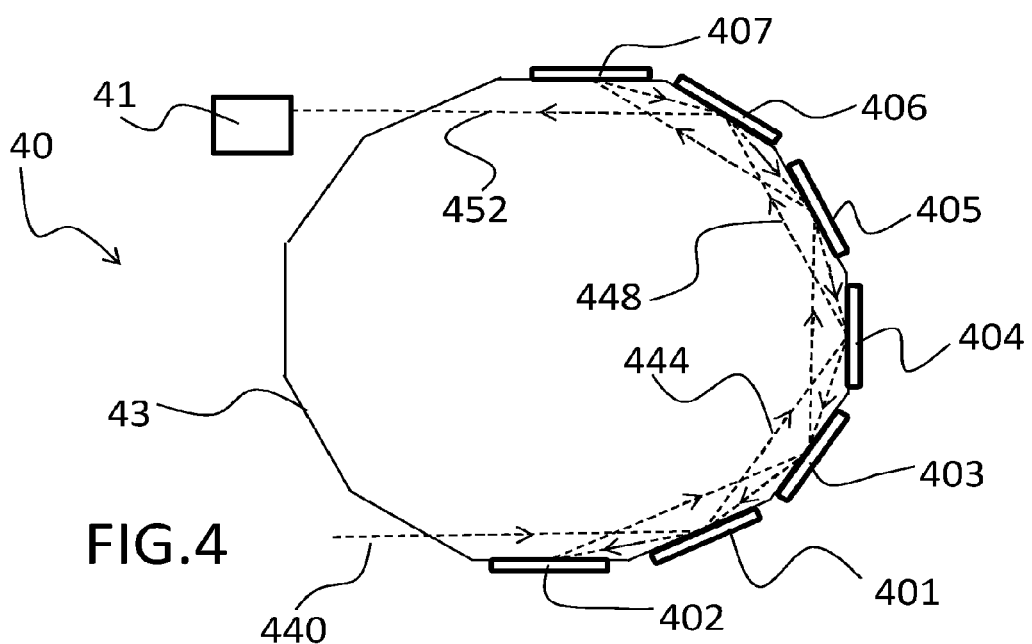
FIG. 4 illustrates a second embodiment of a spectrometer according to the invention.

FIG. 4 diagrammatically shows a second embodiment of the spectrometer 40 according to the invention. The embodiment in FIG. 4 is a special case of the spectrometer shown in FIG. 2.

The spectrometer in FIG. 4 is adapted to receive an incident light beam with a central wavelength of 1053 nm, incident with an angle of about 61° on the first diffraction grating.

The spectrometer 40 in FIG. 4 comprises seven diffraction gratings 402, 401, 403, 404, 405, 406 and 407, located on consecutive sides of a regular dodecagon 43.

The diffraction gratings 401, 402, 403 correspond to the diffraction gratings 301, 302, 302 of the spectrometer in FIG. 3. The initial beam 440 corresponds to the initial beam 340 in FIG. 3. The sub-beam 444 corresponds to the sub-beam 344 in FIG. 3.

The sub-beam 444 is incident on the fourth diffraction grating 404 with an angle of incidence of 61°. The geometry corresponding to diffraction gratings 401, 402, 403 is obtained with diffraction gratings 404, 403, 405.

Thus, after one first order diffraction on gratings 403 and 405 and two first order diffractions on grating 404, the sub-beam 448 is obtained. The sub-beam 448 is incident on the sixth diffraction grating 406 with an angle of incidence of 61°. The geometry corresponding to diffraction gratings 401, 402, 403 is obtained with diffraction gratings 406, 405, 407.

After one first order diffraction on gratings 405 and 407 and two first order diffractions on grating 406, the sub-beam 452 is obtained. Sub-beam 452 is directed towards the photodetector 41.

This regular chaining of diffraction gratings could be continued.

As a variant, the diffraction gratings are not aligned on consecutive sides of a regular dodecagon, but are parallel to consecutive sides of a regular dodecagon. Regular chaining of diffraction gratings along a spiral line can thus be continued.

It can be seen that each diffraction grating, except for diffraction gratings at the ends of the chaining of diffraction gratings, receives the same portion of the initial light beam twice. Therefore, there are n diffraction gratings, and thus the resolution power is increased by a factor of 2*(n−1), for identical grating pitch and beam width. In other words, for an equal resolution power, the diameter of the initial light beam is divided by a factor 2*(n−1). One limitation to the number of gratings is the increase in the width of the diffracted beam as it passes on the diffraction gratings. It can also be noticed that a focal distance of a focusing lens (not shown) used to focus a final sub-beam on the photodetector, is also divided by a factor 2*(n−1).

The domain of the invention is more particularly infrared spectrometry (for example with wavelengths between 1000 nm and 2000 nm).

It can be seen that as before, for an angle of incidence of the initial light beam 440 on the first diffraction grating 401 equal to 60.2°, the sub-beam 444 is directed along the same direction as the specular reflection (order 0 diffraction) of the initial light beam on the first diffraction grating 401. This specular reflection is then diffracted on the fourth diffraction grating 404. The order 0 of this diffraction propagates along the same direction as the sub-beam 448, and so on as far as the photodetector 41. There is an energy loss at each diffraction. Thus, the light energy of incident specular reflection on the photodetector corresponding to successive order 0 diffractions is sufficiently low so that it does not disturb detection by blinding the photodetector.

According to one variant not shown, a deflecting element adapted to deviate a light beam by 180° by translating it parallel to itself, is placed for example at the position of the photodetector. For example, one or two roof prisms could be used. It would also be possible to use two mirrors inclined at 90° relative to each other to form a corner, a first of the mirrors receiving a light beam with an angle of incidence of 45°. Thus, a sub-beam emerging from the spectral dispersion means returns to these means. This thus doubles the number of passes on the diffraction gratings. A photodetector is then installed so as to receive the sub-beam obtained. Several deflecting elements could be provided to multiply the number of passes on the spectral dispersion means.

Different variants of the embodiments in FIGS. 3 and 4 could be envisaged, for example by adapting the pitch of the diffraction gratings to a central wavelength of the initial light beam.

The invention is not limited to the examples that have just been described, and many variants and embodiments could be envisaged without going outside the scope of this invention. For example, regular polygons other than a dodecagon could be envisaged, for example a hexagon. Different characteristics from different embodiments could be combined without going outside the scope of this invention, provided that the required technical effect is still achieved. For example, a spiral layout of the diffraction gratings could be made, arranged parallel to consecutive sides of a convex polygon, regardless of the other parameters of the spectrometer according to the invention. The initial light beam could be emitted continuously or in pulses, and typically a single pulse.

The invention claimed is:

1. A spectrometer comprising:
spectral dispersion means of an initial light beam; and
a photodetector, to measure light intensity of an incident light beam;
wherein the spectrometer does not form a closed cavity, and the spectral dispersion means comprises at least three reflective diffraction gratings parallel to consecutive sides of a convex polygon, arranged such that:
a portion of the initial light beam is diffracted once by each of the diffraction gratings in turn and is diffracted at least a second time by at least one of the diffraction gratings, this portion of the initial light beam forming the incident light beam on the photodetector; and
the optical path followed by the portion of light beam connects directly, without intermediate reflection on an interposed mirror, a first diffraction grating to a second diffraction grating, the second diffraction grating to a third diffraction grating, and the third diffraction grating to the first diffraction grating.

2. A spectrometer according to claim 1, wherein the reflective diffraction gratings are aligned on consecutive sides of the convex polygon.

3. A spectrometer according to claim 1, wherein the first diffraction grating is arranged between the second diffraction grating and the third diffraction grating, along the convex polygon and the first, second, and third diffraction gratings are arranged such that:
the first diffraction grating receives a first light beam and returns a first sub-beam, corresponding to order $m_1$ diffraction of the first light beam on the first diffraction grating, wherein $m_1$ is an integer greater than or equal to 1;
the second diffraction grating receives the first sub-beam and returns a second sub-beam, corresponding to $m_2$ order diffraction of the first sub-beam on the second diffraction grating, wherein $m_2$ is an integer greater than or equal to 1;
the third diffraction grating receives the second sub-beam and returns a third sub-beam corresponding to $m_3$ order diffraction of the second sub-beam on the third diffraction grating, wherein $m_3$ is an integer greater than or equal to 1; and
the first diffraction grating receives the third sub-beam and returns a fourth sub-beam, corresponding to $m_4$ order diffraction of the third sub-beam on the first diffraction grating, wherein $m_4$ is an integer greater than or equal to 1.

4. A spectrometer according to claim 3, wherein the orders $m_1$, $m_2$, $m_3$, and $m_4$ are equal.

5. A spectrometer according to claim 4, wherein the orders $m_1$, $m_2$, $m_3$, and $m_4$ are equal to 1.

6. A spectrometer according to claim 3, wherein an angle between the first and second diffraction gratings is equal to an angle between the first and third diffraction gratings.

7. A spectrometer according to claim 1, wherein the diffraction gratings are aligned on consecutive sides of a regular polygon.

8. A spectrometer according to claim 1, wherein the diffraction gratings are arranged such that:
each diffraction grating receives an incident light beam, and returns a sub-beam corresponding to the $m_i$ order diffraction of the incident light beam on the diffraction grating, wherein $m_i$ is an integer greater than or equal to 1;
an absolute value of a difference between an angle of incidence of the incident light beam on the diffraction grating, and a median angle of the sub-beam relative to the diffraction grating, is the same within plus or minus six degrees for each diffraction grating.

9. A spectrometer according to claim 1, wherein an optical path followed by the portion of the initial light beam directly connects one diffraction grating to a next diffraction grating.

10. A spectrometer according to claim 1, wherein each diffraction grating includes reflecting stripes parallel to a reference axis, and is mounted on means of pivoting about the reference axis.

11. A spectrometer according to claim 1, wherein each diffraction grating has an identical grating pitch.

12. A spectrometer according to claim 1, wherein an angle between two consecutive diffraction gratings is between 140° and 160°, and each diffraction grating has a line density equal to 1740 lines per millimeter.

13. A method of using a spectrometer according to claim 1, wherein the spectrometer is adapted to a central wavelength of the incident light beam by pivoting each diffraction grating by an angle $\theta$ and by an angle $-\theta$ alternately.

* * * * *